United States Patent [19]

Frick et al.

[11] Patent Number: 4,854,800

[45] Date of Patent: Aug. 8, 1989

[54] OPEN SEA TRANSFER OF ARTICLES

[75] Inventors: Heinz E. Frick; Dennis J. Mottram, both of Surrey, England

[73] Assignee: British Aerospace Public Limited Company, London, England

[21] Appl. No.: 196,893

[22] Filed: May 19, 1988

Related U.S. Application Data

[63] Continuation of Ser. No. 768,142, Aug. 22, 1985, abandoned.

[30] Foreign Application Priority Data

Aug. 22, 1984 [GB] United Kingdom ................. 8421322

[51] Int. Cl.⁴ ............................................. B65G 67/62

[52] U.S. Cl. ............................... 414/138.2; 414/137.9; 414/138.3; 414/786

[58] Field of Search ............... 414/137.9, 138.2, 138.3, 414/705, 706, 708, 786

[56] References Cited

U.S. PATENT DOCUMENTS

| | | | |
|---|---|---|---|
| 3,332,716 | 7/1967 | Gridley | 414/140 X |
| 3,428,356 | 2/1969 | Anderson | 294/82.32 X |
| 3,700,132 | 10/1972 | Waters | 414/705 |
| 3,756,446 | 9/1973 | Macrander | 414/140 |
| 4,295,771 | 10/1981 | Mehesan, Jr. | 414/705 X |
| 4,317,524 | 3/1982 | Andersson | 414/138 X |
| 4,523,729 | 6/1985 | Frick | 244/115 |

FOREIGN PATENT DOCUMENTS

| | | | |
|---|---|---|---|
| 260447 | 11/1970 | U.S.S.R. | 414/138 |
| 1224948 | 3/1971 | United Kingdom . | |
| 1511428 | 5/1978 | United Kingdom . | |
| 2003109 | 3/1979 | United Kingdom . | |
| 2104014 | 3/1983 | United Kingdom . | |
| 2138771 | 10/1984 | United Kingdom | 414/137 |
| 8301059 | 3/1983 | World Int. Prop. O. | 294/90 |

*Primary Examiner*—Robert J. Spar
*Assistant Examiner*—Janice Krizek
*Attorney, Agent, or Firm*—Cushman, Darby & Cushman

[57] ABSTRACT

An arrangement for effecting open sea transfer of articles to and from a vessel subject to movement in the pitch, roll, yaw, heave and sway senses includes a gantry having one end carried by the vessel, and a free end having a carrying device adapted for carrying an article, the gantry being articulated such that the carrying device can be substantially stabilized in space whereby it maintains a generally constant position or course in space irrespective of the motion of the vessel.

18 Claims, 3 Drawing Sheets

Figure 2:
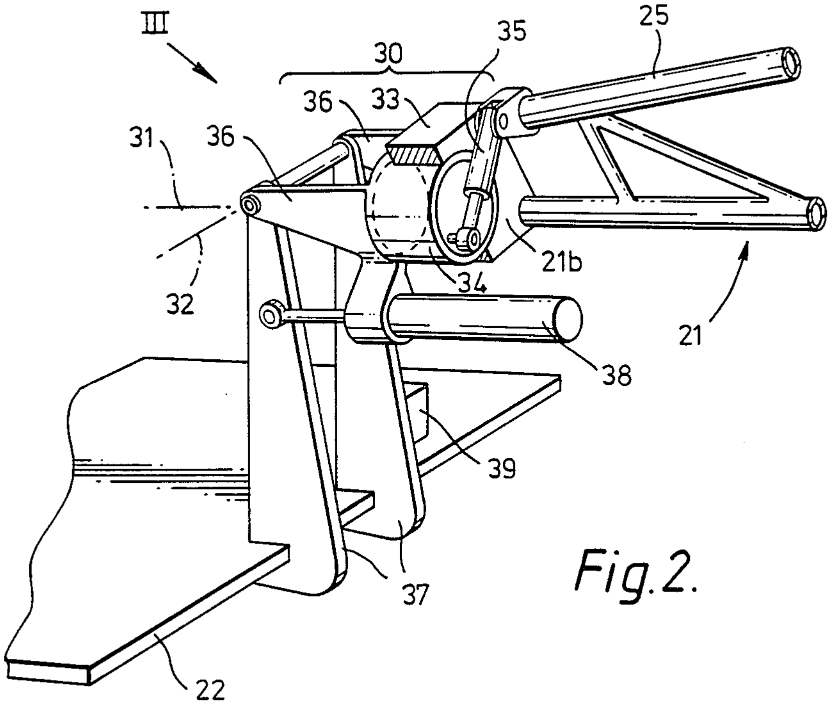

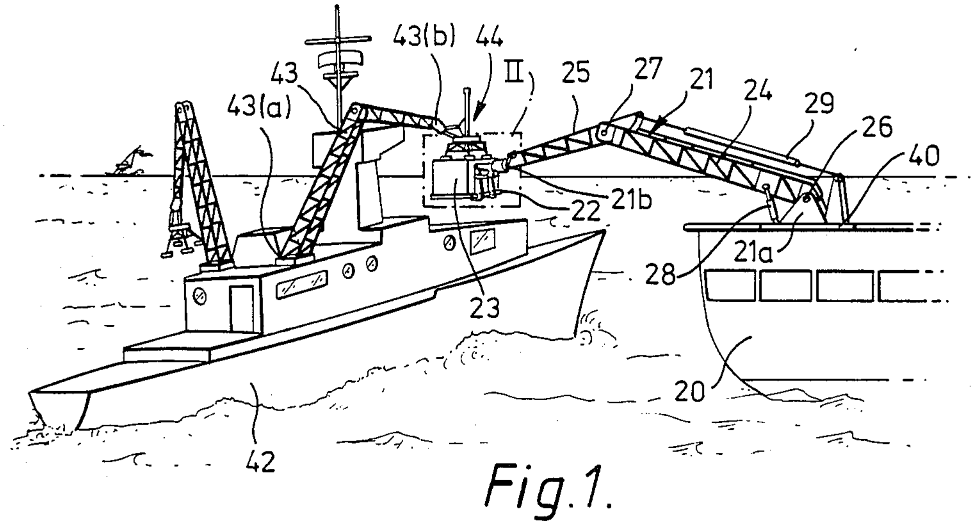
Fig.1.
Fig.4.
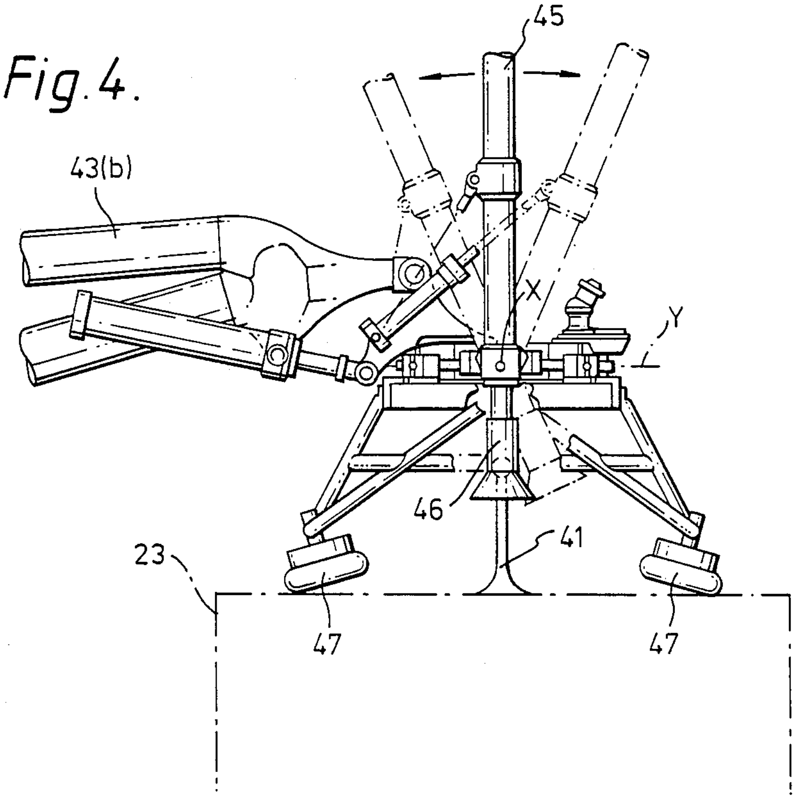

OPEN SEA TRANSFER OF ARTICLES

This is a continuation of application Ser. No. 768,142, filed Aug. 22, 1985, which was abandoned upon the filing hereof.

This invention is concerned with the transfer of articles from a vessel in open sea conditions. The ability to effect such transfer is necessary between a donor and a receiver vessel for the replenishment of stores, weapons and so forth, or between a donor vessel and a receiver platform such as an oil rig.

Because of the individual motion of a vessel in the open sea, namely pitch, roll, yaw, heave and sway, it has always been difficult to effect transfer of articles. Cable systems are commonly used with the ever present possibility of the articles becoming doused during transfer. Helicopter systems can also be used but are expensive to operate needing both skilled crews and the room to manoeuvre.

The present invention has for an objective the provision of a transfer arrangement in which the disadvantages attributable to both cable and helicopter systems are removed.

According to one aspect of the invention, an arrangement for effecting open sea transfer of articles from a vessel subject to movement in the pitch, roll, yaw, heave and sway senses includes a gantry having one end carried by the vessel, and a free end having carrying means adapted for carrying an article, the gantry being articulated such that the carrying means can be stabilised in space whereby it maintains a generally constant position or course in space irrespective of the motion of the vessel.

If the vessel is stationary, naturally said carrying means maintains a generally constant position, but if the vessel is moving, said carrying means maintains a generally constant course in space.

In the commonly-assigned prior Frick's U.S. Pat. No. 4,523,729, issued June 18, 1985 there is described a system for retrieving and/or launching an aircraft including a gantry pivotally mounted upon a vessel, the gantry and the aircraft being provided with complementary engagement means which are releasably engageable to allow the whole weight of the aircraft to be carried by the gantry subsequent to acquisition or prior to launch. The gantry is stabilised in space so that the aircraft can fly or hover with the parts of the complementary engagement means in sufficiently close station to enable engagement to take place irrespective of vessel motion.

A further aspect of the present invention is that said arrangement for effecting open sea transfer of articles is compatible with the system according to the aforesaid patent of Frick or to similar systems when that or those systems are not in aircraft use. This not only makes use of equipment which is already provided on the receiver vessel, but also aids separation of the receiver and donor vessels. Where two vessels are travelling in station side-by-side, there is the ever present possibility of them being uncontrollably drawn together by the hydrodynamic forces between the two hulls. The provision of a gantry on both the receiver and donor vessels helps to maintain distance during article transfer.

The article to be transferred may be a container, conveniently of standardised form, for housing stores or personnel.

Where it is used with the system of the aforesaid patent of Frick, the article is provided with that part of the complementary engagement means otherwise carried by the aircraft.

Irrespectively, said carrying means are adapted to carry the articles until the complementary engagement means are engaged, and with means to hold it on the carrying means until such engagement.

Whilst the specification describes the invention with reference to donor and receiver vessels for ease of description, it will be appreciated that the roles may be reversed.

Figure 3:
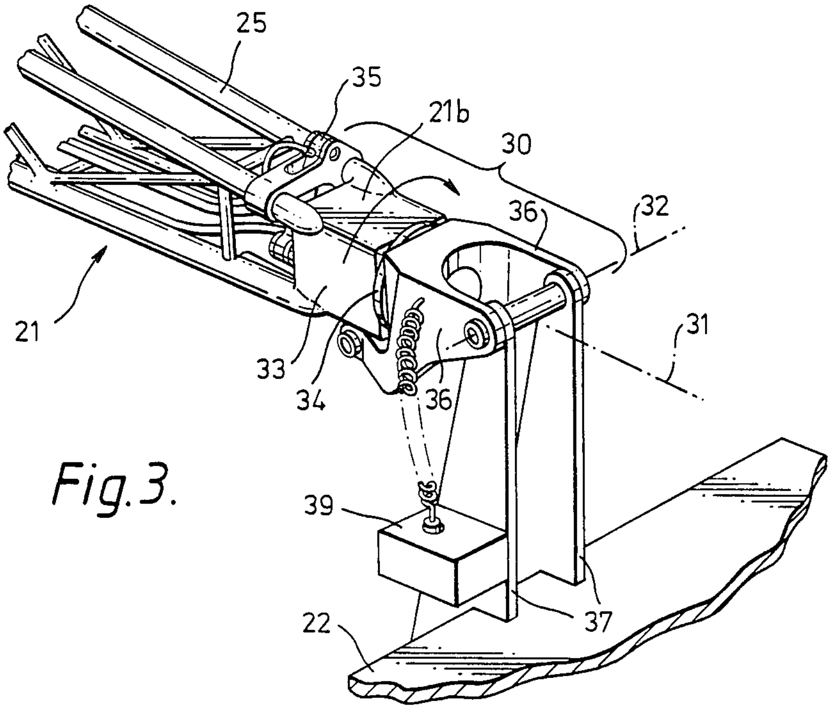
Figure 5C:
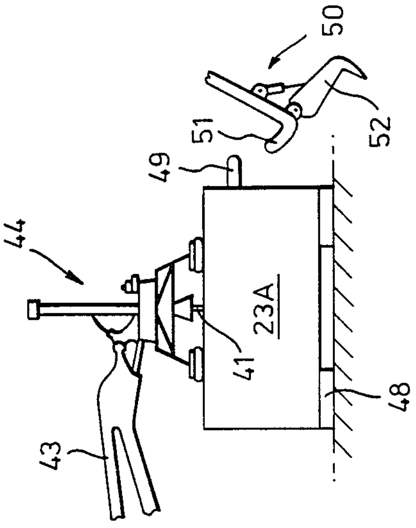
Figure 5B:
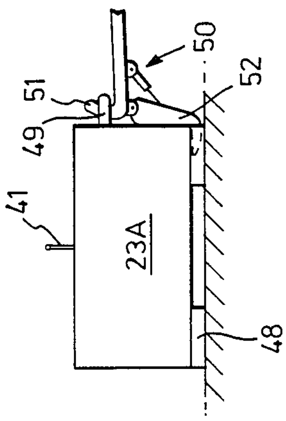
Figure 5A:
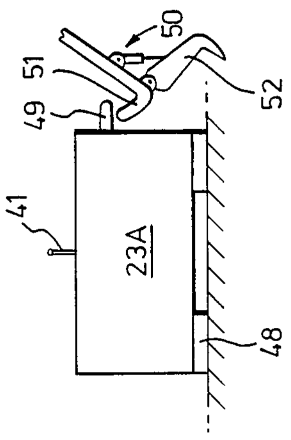

One embodiment of the invention is described with reference to the accompanying drawings, in which:

FIG. 1 is a view of two vessels travelling in station side-by-side,

FIG. 2 is a perspective view of that part of the gantry and carrying means encompassed by box II of FIG. 1, the gantry being partially cross sectioned and having structural elements removed for clarity, FIG. 3 is a perspective view upon Arrow III of FIG. 2, FIG. 4 is a side view of part of a receiver system according to the aforesaid patent of Frick, and FIGS. 5*a,b,* and *c* illustrate a locking and locating means for a container arrangement upon the donor gantry.

Referring to the Figures, a transfer arrangement for a donor vessel 20 includes a gantry 21 which has one end 21*a* mounted upon the vessel and a further, free, end 21*b*. On the free end is mounted a carrying device in the form of a load platform 22 which is adapted to carry an article to be transferred, for example a container 23.

The load platform 22 is naturally only one way of supporting the article to be transferred; it could be replaced by a container engaging arrangement to be later described. Irrespectively, the article to be transferred must be positively located, e.g. by lips or channels on the platform 22, until transference is successfully effected.

The load carrying device is space stabilised; it carries a stabilisation sensing arrangement of known design (e.g. an inertial platform) which senses the movement of the load carrying device in space and provides signals so that the gantry can be so controlled by jacks and associated control means of known design that the sensed movements are compensated for. In order that this stabilisation can be effected, the gantry is formed in two major articulated portions 24 and 25 and each of which is provided with control jacks which respond to the stabilisation control demands. That gantry portion 24 is pivoted at the gantry end 21*a* about an axis 26 which can be moved to a position parallel to the fore-and-aft axis of the donor vessel, whilst that portion 25 is pivoted to the portion 24, about an axis 27 parallel to the axis 26. The control jack effecting pivotal movement about the axis 26 is referenced 28 whilst that effecting pivotal movement about the axis 27 is referenced 29.

This arrangement not only enables that portion of the gantry referenced 24 to extend generally upwards and that portion 25 to extend generally downwards with a relatively shallow angle between the two so that the deck of the donor vessel 20 is well cleared and the load platform 22 is positionable below receiving apparatus on a receiving vessel (to be later described), but also enables sufficiently rapid response movements of the jacks to accommodate at least the heave and roll movements of the donor vessel.

To ensure that the load to be transferred is properly presented to the receiving apparatus, between that end 21*b* of the gantry and the load platform 22 which it carries there is provided wrist joint means 30 to provide two further stabilisation movements. One is a rotational movement about an axis 31 lying in a plane normal to the axes 26 and 27 so that at least that vessel movement in pitch can be accommodated. The other is pivotal movement about an axis 32 which lies in a plane normal to that of the axis 31 but rotates about that axis as vessel pitch movements are compensated. The movement about the axis 32 in effect provides a nodding action which together with the rotation about the axis 31 provides a wrist-like action enabling the platform 22 to be maintained generally horizontal in space irrespective of that gantry movement countering the donor vessel movement.

FIGS. 2 and 3 illustrate the wrist joint means 30 in some detail. The end **21*b* of the gantry carries a fixed block 33 having a bearing surface within which a cylindrical spigot 34 is constrained to rotate. Rotation is effected by a jack 35 coupled between the spigot periphery and an anchorage formed upon the portion 25** of the gantry.

In FIG. 2, the block 33 is sectioned in plane including the axis 31 to more clearly show the bearing and spigot arrangement. Also, that portion of the gantry is removed which would normally be associated with the removed sectional part of the block.

The cylindrical spigot 34 carries spaced lugs 36 which provide a pivot mounting for a platform carrier 37 which extends generally downwards from the pivot to carry the platform 22. The platform assembly (i.e. the platform 22 and the carrier 37) pivots in the nodding sense about the axis 32 and rotates about the axis 31, these movements providing the previously discussed wrist action.

The nodding movement is effected by a jack 38 the body of which is carried by, and rotates with, the spigot 34 and the ram of which is coupled to the platform assembly.

As before discussed, the load carrying device carries a stabilisation sensing arrangement in the form of an inertial platform. As illustrated this is mounted upon the carrier 37; it is referenced 39.

The gantry 21 is mounted upon a turntable 40 on the deck of the donor vessel so that it can be rotated to swing the load inboard or outboard, and also, if desired, to counter any yaw movement of the donor vessel. The mountings for the jacks 28 and 29 are naturally fixed to this turntable. During this rotational movement, the load platform 22 changes from moving with donor vessel motion (so that it can be loaded or unloaded) to space stabilisation.

In use the arrangement can be utilised to transfer articles to another vessel either moving or stationary. Since the load carrying platform is space stabilised it is relatively easy to effect acquisition of the article carried thereby from a receiver vessel and to remove it from the platform.

This is preferably achieved using the system described in the aforesaid patent of Frick. In this case the article to be transferred, which conveniently is a container 23 of the type used for international freight forwarding, includes an upwardly directed probe shown diagrammatically at 41 in FIG. 4 designed to be engageable by the apparatus described in that patent.

Alternatively, the article to be transferred may be picked up by a standard crane carried by the receiver vessel or by an oil or gas platform for example. The cable of the standard crane is lowered such that there is some slack when a hook or grab is engaged with the article to be transferred. On such engagement the cable is then wound in. Since the article is space stabilised any violent movement of the donor vessel is minimised and no snatch is caused in the cable. It can be envisaged that if the cable is connected to the article without space stabilisation and the donor vessel drops by several tens of feet, considerable loads are applied to the cable possibly causing 'snatch' breakage.

Referring now to FIGS. 1 and 4, a system according to the aforesaid patent of Frick is illustrated carried by a receiver vessel 42. The vessels are shown operating in parallel station. The donor load platform 22 and the receiving means thus follow a space stabilised course with little relative movement between them.

The vessel 42 carries gantry means 43 mounted at one end 43(*a*) on the vessel and carrying at its free end 43(*b*) downwardly directed engagement means 44 including a movable portion in the form of an acquisition ram 45 and fixed portion in the form of location pads 47. The acquisition ram 45 is positively movable upwards and downwards with reference to the gantry 43 and the pads 47 and has at its lower end a receiver 46 of inverted funnel shape. An upwardly directed engagement means in the form of the probe 41 of suitable profile protrudes upwards from an article (e.g. the container 23) to be transferred, which probe can be accepted in a collet lock arrangement. The receiver 46 houses locking means, not shown, in the form of a releasable bayonet or collet fitting which locks on to the probe 41 and anchors it to the receiver 46.

The ram 45 is pivotally mounted at the end of the gantry 43 about two orthogonal horizontal axes X and Y and rams are provided to effect movement in these senses; these degrees of freedom, together with provision of the upward and downward movement of the ram 45 define a notional window within which the probe 41 may be acquired and locked.

The downwards movement of the acquisition ram 45 is such as to cause the receiver 46 to receive and lock on to the probe 41 of a container or article in station below, the force effecting such movement is therefore positive, but not such as to damage or to greatly displace the container. The force of the upward movement must be such as to bodily carry the container or article upwards away from the load platform into stabilising engagement with the location pads 47.

The gantry means of the receiver vessel also has the ability to compensate for the movements of the vessel in roll, pitch, yaw, heave and sway so that the engagement means is stabilised in space irrespective of vessel movement. Space-stabilising movement of the engagement means is controlled by an inertial platform either similar to that referenced 39 or associated with the navigation system of the receiver vessel.

The gantry 43 can be swung inboard from the position illustrated in FIG. 1 so that a transferred article or container can be placed upon the receiver vessel deck. As this action occurs, the gantry 43 is controlled gradually to become ship, rather than space, stabilised.

In operation, assuming the gantries 21 and 43 to be positioned as illustrated in FIG. 1, the article or container to be transferred is held slightly lower than the engagement means 44.

Since, as illustrated, the probe 41 protrudes upwards from the container or article, when the container or article is in the acquisition window, the acquisition ram 45 is signalled to be lowered and the probe 41 is received and locked into the receiver 46 for container or article carrying engagement. The increased load on ram 45 is sensed by a control system which causes the acquisition ram 45 to be raised and the container or article to be bodily moved upwards to be engaged by the location pads 47 for rendering it rigid on the engagement means.

The gantry 43 is now caused gradually to become ship rather than space stabilised and the container is swung inboard to rest upon the deck.

Although described with reference to a vessel equipped with the system of the aforesaid patent of Frick, naturally the arrangement associated with the donor vessel 20 can be used independently, for example as previously described.

Referring now to FIG. 5, it is possible to provide an arrangement in which the load platform 22 is unnecessary. In this case, a specially designed container 23A is provided. This is provided with channels 48 on its base and lugs 49 on its side. It has a probe 41 as previously described. Instead of the platform 22, the gantry 21 is provided with an articulated hook arrangement 50, comprising upwardly extending hooks 51 which engage with the lugs 49 and longitudinally extending forks 52 which engage with the channels 48. The hooks and forks are pivoted together. By way of explanation, FIG. 5*a* shows the container prior to being grasped by the hook arrangement 50, FIG. 5*b* shows the container in grasped condition ready to be swung outboard of the donor vessel for transfer, and FIG. 5*c* shows the container acquired by the engagement means 44.

We claim:

1. An arrangement for open sea transfer of articles between one vessel and another, both being subject to movement in the pitch, roll, yaw, heave and sway senses includes a first gantry having one end carried by a first vessel and a free end having carrying means adapted for carrying an article with a generally upwardly directed engagement means, the first gantry being articulated such that the carrying means can be stabilised in space whereby it maintains a generally constant position or course in space irrespective of the motion of the first vessel, a second gantry having one end carried by a second vessel and a free end having generally downwardly directed engagement means having a fixed portion and a movable portion for engaging said upwardly directed engagement means, the second gantry being articulated such that the downwardly directed engagement means can be substantially stabilised in space whereby it maintains a generally constant position or course in space irrespective of the motion of the second vessel, said first gantry being articulated such that the upwardly directed engagement means can be positioned generally below said downwardly directed engagement means when an article is to be transferred, the movable portion of said downwardly directed engagement means having means to effect downward movement to effect mating engagement with said upwardly directed engagement means.

2. An arrangement according to claim 1 wherein the fixed portion of said downwardly directed engagement means includes pad means against which the article being transferred can be drawn by upward movement of the movable portion of the downwardly directed engagement means subsequent to mating engagement with the upwardly directed engagement means.

3. An arrangement according to claim 1 wherein said first gantry is articulated about at least a first axis so that it can be pivoted in the elevation sense, and the carrying means is carried by the free end of the gantry by means of wrist action joint means allowing both rotation movement about a second axis in a plane normal to the plane of said first axis and pivotal movement about a third axis in a plane normal to the plane of said second axis.

4. An arrangement according to claim 3 wherein the first gantry in addition to being articulated about said first axis is also articulated about a fourth axis parallel to said first axis, the gantry being formed in two parts, a first part being pivoted about said first axis and a second part pivoted to said first part about said fourth axis.

5. An arrangement according to claim 1 wherein the carrying means itself carries inertial platform means.

6. An arrangement according to claim 1 wherein the carrying means is in the form of a load platform.

7. An arrangement according to claim 1 wherein the carrying means is in the form of a hook arrangement.

8. An arrangement according to claim 1, wherein:
the step of controllingly articulating said first and second gantries is performed using stabilisation sensing means which is provided in the form of an inertial platform means.

9. An arrangement according to claim 1, wherein:
the carrying means is in the form of a load platform.

10. An arrangement according to claim 1, wherein:
the carrying means is in the form of a hook arrangement.

11. A method for effecting open sea transfer of an article between a first vessel and a second vessel, both vessels being subject to movement in the pitch, roll, yaw, heave and sway senses, said method including:

(a) providing a first gantry having a first end carried by said first vessel for movement therewith, and a free end supporting a first article carrier for disengageably securing an article to the first article carrier;

(b) providing a second gantry having a first end carried by said second vessel for movement therewith, and a free end supporting a second article carrier for disengageably securing an article to the second article carrier;

(c) disengageably securing an article to the first article carrier;

(d) while controllingly articulating both said first gantry and said second gantry so as to stabilise both said first article carrier and said second article carrier in space so that each said article carrier maintains a generally constant position or course in space irrespective of motion of the respective said vessels, (i) maneuvering said first article carrier, with said article disengageably secured thereto into a predetermined spatial relationship of proximity with said second article carrier, (ii) extending at least part of said second article carrier toward said first article carrier relative to the free end of the gantry on which such article carrier is supported, sufficiently to disengageably secure the article to said second article carrier, (iii) disengaging said article from said first article carrier, and (iv) retracting said at least part of said second article carrier so as to enable said article to be secured and supported by said second article carrier.

12. The method of claim 11, wherein:

in substep (ii) of step (d), a part of one of said article carriers is moved vertically toward the other of said article carriers.

13. The method of claim 11, wherein:

in substep (ii) of step (d), a part of said second article carrier is moved vertically downwardly toward said first article carrier.

14. A method for effecting open sea transfer of articles between one vessel and another, both being subject to movement in the pitch, roll, yaw, heave and sway senses, including:

providing on each vessel a gantry having one end carried by the vessel, and a free end having carrying means adapted for carrying an article, the gantry being articulated and provided with stabilisation means such that the carrying means can be substantially stabilised in space whereby it maintains a generally constant position or course in space irrespective of the motion of the vessel, providing the carrying means of at least a receiver one of said vessels with engagement means for co-operative engagement with the articles, positioning the articles on the carrying means of a donor one of said vessels, maneuvering the vessels so that their respective gantries are in range of one another, and controlling the articulations of said gantries so that the articles can be engaged by the engagement means of the receiving vessel, released from the carrying means of the donor vessel, and thereby transferred to the carrying means of the receiving vessel.

15. A method for effecting open sea transfer of articles between one vessel and another, both being subject to movement in the pitch, roll, yaw, heave and sway senses, including:

providing a first gantry having one end carried by a first vessel and a free end having carrying means adapted for carrying an article with a generally upwardly directed engagement means, the first gantry being articulated and provided with stabilisation sensing means such that the carrying means can be stabilised in space whereby it maintains a generally constant position or course in space irrespective of the motion of the first vessel;

providing a second gantry having one end carried by a second vessel and a free end having generally downwardly directed engagement means having a fixed portion and a moveable portion for engaging said upwardly directed engagement means, the second gantry being articulated and provided with stabilisation sensing means such that the downwardly directed engagement means can be substantially stabilised in space whereby it maintains a generally constant position or course in space irrespective of the motion of the second vessel, positioning an article on the carrying means of the first gantry, maneuvering the vessels so that the first and second gantries are within range of each other, positioning the first gantry so that the upwardly directed engagement means on the article is generally below said downwardly directed engagement means, effecting downward movement of the moveable portion of said downwardly directed engagement means to effect mating engagement with said upwardly directed engagement means, releasing the article from the carrying means of the first gantry and thereby transferring the article to the carrying means of the second gantry.

16. A method according to claim 15, wherein:

the fixed portion of said downwardly directed engagement means includes pad means and the method further includes the step of drawing the article being transferred against the pad means by upward movement of the moveable portion of the downwardly directed engagement means subsequent to mating engagement with the upardly directed engagement means.

17. A method acording to claim 15, wherein:

said first gantry is articulated about at least a first axis so that it can be pivoted in the elevation sense, and the carrying means is carried by the free end of the gantry by means of wrist action joint means allowing both rotation movement about a second axis in a plane normal to the plane of said first axis and pivotal movement about a third axis in a plane normal to the plane of said second axis.

18. A method according to claim 17, wherein:

the first gantry in addition to being articulated about said first axis is also articulated about a fourth axis parallel to said first axis, the gantry being formed in two parts, a first part being pivoted about said first axis and a second part pivoted to said first part about said fourth axis.

* * * * *